United States Patent [19]

Laninga et al.

[11] Patent Number: 4,934,671
[45] Date of Patent: Jun. 19, 1990

[54] SELF ALIGNING AIR BEARING PLATFORM

[75] Inventors: Albert J. Laninga; David C. Lehnen, both of Tempe, Ariz.

[73] Assignee: Motorola Inc., Schaumburg, Ill.

[21] Appl. No.: 343,768

[22] Filed: Apr. 27, 1989

[51] Int. Cl.$^5$ .................................................. B23Q 1/02
[52] U.S. Cl. .................................... 269/20; 269/73; 269/285; 269/75; 384/12; 384/99
[58] Field of Search ...................... 269/71, 73, 75, 258, 269/285, 20, 21, 35, 55; 384/99, 12; 33/1 M, DIG. 2

[56] References Cited

U.S. PATENT DOCUMENTS

| | | | |
|---|---|---|---|
| 2,573,542 | 10/1951 | Cherry | 269/71 |
| 3,463,563 | 8/1969 | Pfaff | 384/12 |
| 4,234,175 | 11/1980 | Sato et al. | 269/73 |
| 4,320,926 | 3/1982 | Heinemann et al. | 384/12 |

*Primary Examiner*—Robert C. Watson

*Attorney, Agent, or Firm*—Joe E. Barbee; Miriam Jackson

[57] ABSTRACT

Two partial cylindrical, externally pressurized static air bearings are used to provide a self aligning air bearing platform. The self aligning air bearing platform is useful in a tape automated bonding system to bond a semiconductor device having a high pin count. A bottom bearing block has a top surface in the shape of an arc and at least one air outlet. A middle bearing block has a bottom surface configured to mate with the top surface of the bottom bearing block. The middle bearing block also has a top surface in a shape of an arc which is rotated 90° with respect to the arc shaped top surface of the bottom bearing block and at least one air outlet. A top bearing block mates with the middle bearing block and provides the platform for holding the semiconductor device. Air bearings between the moving bearing blocks provide a low friction bearing for the aligning platform.

3 Claims, 2 Drawing Sheets

SELF ALIGNING AIR BEARING PLATFORM

Background of the Invention

This invention relates, in general, to aligning or orienting devices, and more particularly, to an air bearing platform which is essentially self aligning.

During the manufacture and assembly of components it is often necessary to position or hold a work piece in a coplanar orientation. This is particularly true when assemblying very large scale integrated circuits. During the inner lead bonding (ILB) in a tape automated bonding (TAB) process of such circuits, they must be held parallel or coplanar in order to apply a uniform bonding pressure to all the leads around the perimeter of the integrated circuit. It is important that the orientation procedure be fast and require a minimum amount of operator skill. In the past, work platforms used in a TAB bonder were aligned to be coplanar by trial and error which required a skilled operator and consumed a considerable amount of time.

Accordingly, it is an object of the present invention to provide a self aligning air bearing platform.

Another object of the present invention is to provide an orienting platform which is easily and accurately aligned without requiring the intervention of a skilled operator.

Yet another object of the present invention is to provide a low friction, easily locked/unlocked orienting platform.

Yet a further object of the present invention is to provide two cylindrical air bearing with a pivot point at the point where work surfaces are to be parallel.

Summary of the Invention

The above and other objects and advantages of the present invention are achieved by providing a self aligning air bearing platform on which a work piece is to be mounted. A bottom bearing block has a concave shaped top surface and a plurality of air outlets. An upper bearing block is positioned over the bottom bearing block and has a bottom shaped to mate with the top surface of the bottom bearing block. The upper bearing block has a top surface which is configured to accommodate the work piece. When air pressure is applied to the air outlets the upper bearing block is forced away from the bottom bearing block to provide a friction free interface. The radial center of the concaved shaped top surface of the bottom bearing block is located at the top surface of the work piece mounted on the upper bearing block.

A middle bearing block is also used. The middle bearing block will mate with the bottom and upper bearing blocks, and provide an air bearing between the middle and upper bearing blocks.

Detailed Description of the Drawings

Figure 1:
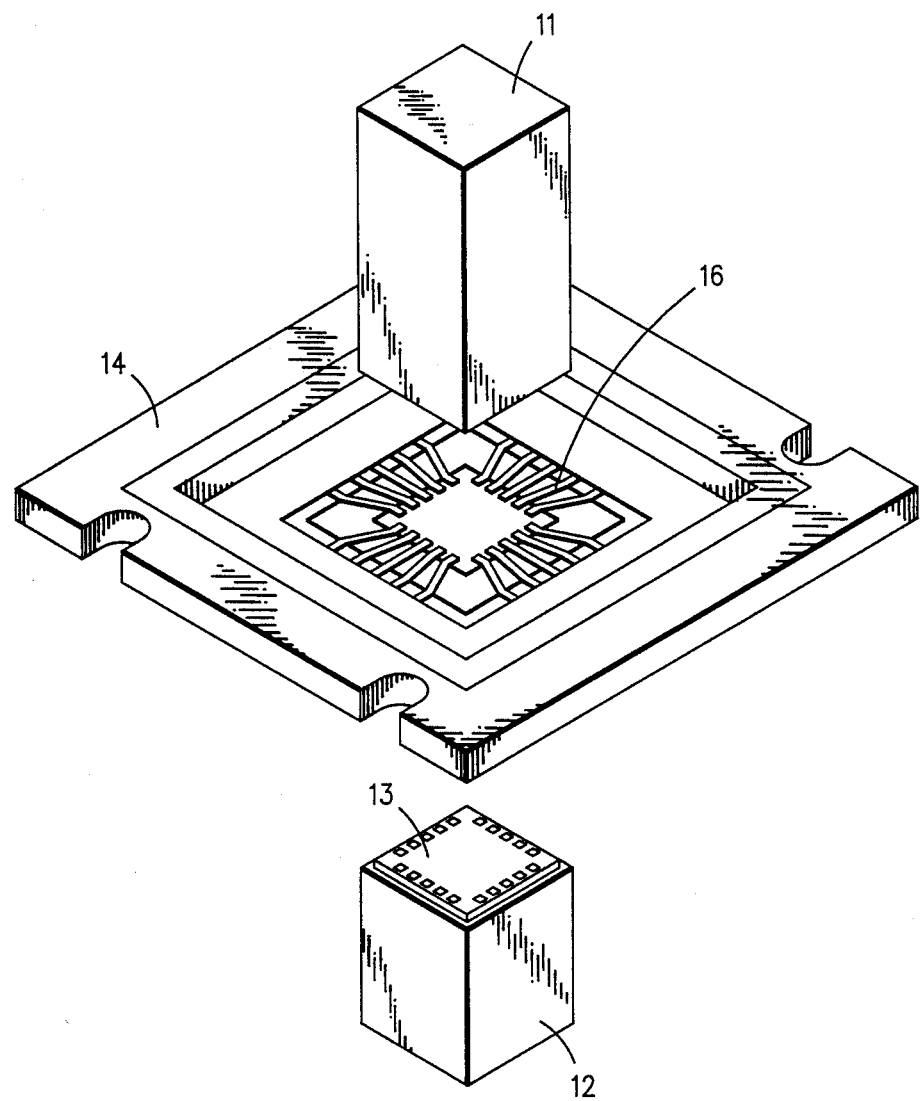
FIG. 1 illustrates an application for the present invention.

FIG. 1 illustrates a specific application that requires the present invention. FIG. 1 illustrates a setup for a tape automated bonding (TAB) system. A thin film tape 16 contains a plurality of leads which must be bonded to a semiconductor device 13. Semiconductor device 13 has a plurality of contact bumps around its periphery. Film 16 is held in a film carrier frame 14. Semiconductor device 13 is mounted on an orienting or alignment platform 12 which, in a preferred embodiment, also serves as a heater block. Thermode bonding tool 11 is used to bond the leads of film 16 to semiconductor device 13 and is illustrated as being a rectangular block although it is actually a very complex configuration. The important feature is that bonding tool 11 has a flat bottom surface. It is essential that semiconductor device 13 be parallel with the bottom surface of thermode bonding tool 11. If bonding tool 11 is not parallel, the bonding pressure will not be equal on all the leads of film 16. Some of the leads will receive too much pressure, and those leads on the opposite side of semiconductor device 13 will not receive enough pressure. Thermode bonding tool 11 bonds all the leads of film 16 to semiconductor device 13 at the same time. If one bond at a time, rather than all bonds at once, were made the critical requirement of parallelism would not exist; however, such a system would be very slow and the bonding system complexity would be much greater. The present invention provides a self aligning air bearing for platform 12 to allow the top surface of semiconductor device 13 to float so that when the bottom surface of thermode bonding tool 11 and the top surface of device 13 make contact they will be coplanar with each other.

Figure 2:
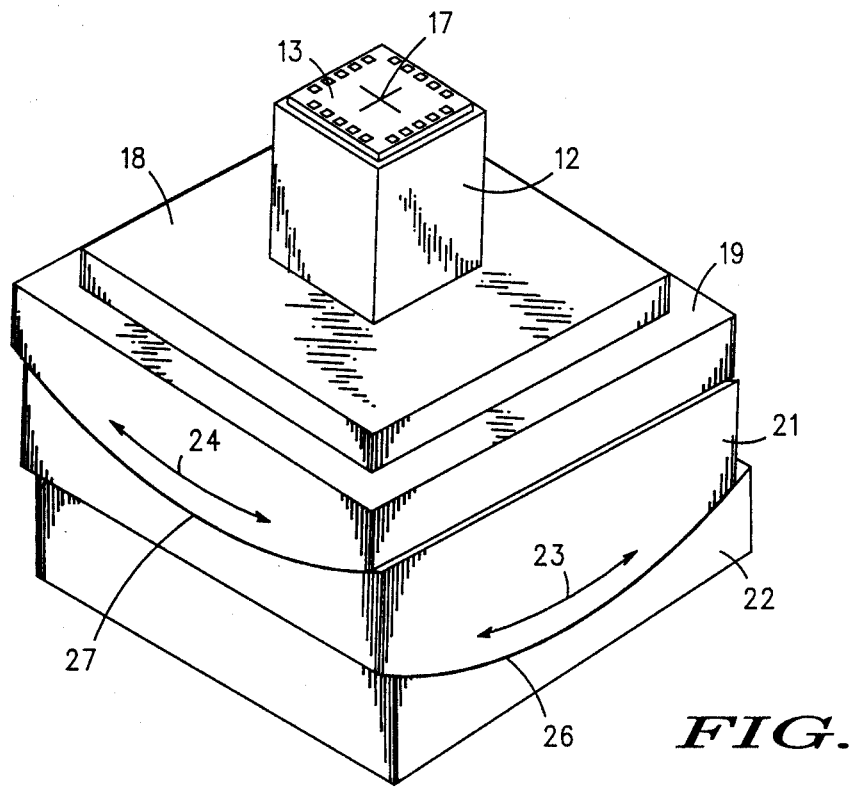
FIG. 2 illustrates the self aligning air bearing platform of the present invention.

FIG. 2 illustrates a self aligning air bearing platform useful in maintaining semiconductor device or work piece 13 in a properly aligned position. A bottom bearing block 22 has a cusped shape or arch 26 on its top surface. A middle bearing block 21 has a lower surface which mates with the top surface of bottom bearing block 22. This allows middle bearing block 21 to move in an arc as illustrated by arrow 23. The top surface of middle bearing block 21 has a top surface shaped in a cusp or arc configuration 27. As illustrated in FIG. 2 arc 27 is at right angles to arc 26. Positioned on middle bearing block 21 is a top bearing block 19. Top bearing block 19 has a bottom surface configured to mate with the top surface of middle bearing block 21. This allows top bearing block 19 to move in an arc illustrated by arrow 24. Top bearing block 19 has a top surface which is illustrated as being flat to receive flange 18. Flange 18 and pedestal or heater block 12 may be one piece or two separate pieces which are mated together. This configuration allows the top surface of top bearing block 19 to accommodate more than just one size of pedestal 12 which in turn permits more than just one size of semiconductor device 13 to be aligned.

Work piece or semiconductor device 13 is mounted on top of pedestal 12. A pivot point 17 is located on the top surface of semiconductor device 13. Pivot point 17 is a radial center of arc 27 and also the radial center of arc 26. In a preferred embodiment, radial center or pivot point 17 is located in the center of the top surface of work piece 13. This places pivot point 17 at the surfaces which are required to be parallel. If pivot point 17 were not at the top surface of work piece 13, then work piece 13 would move sideways by the sine of the angle times the distance of the top from pivot point 17. Arc 26 and arc 27 may be viewed as partial cylinders each having its radial center intersect at pivot point 17. Arc 26 and arc 27 are illustrated as being 90° of each other.

However, it should be understood that these arcs could be at any angle with respect to each other other than zero and still provide the leveling function. Any angle other than 90° would require further movement of the bearing blocks in order to provide the leveling function. Middle bearing block 21 is illustrated as being slightly offset with respect to bottom bearing block 22, just to illustrate the motion therebetween. In the same manner top bearing block 19 is shown in a moved position with respect to middle bearing block 21. This is merely for illustrating the movement of the bearing blocks with respect to each other.

Figure 3:
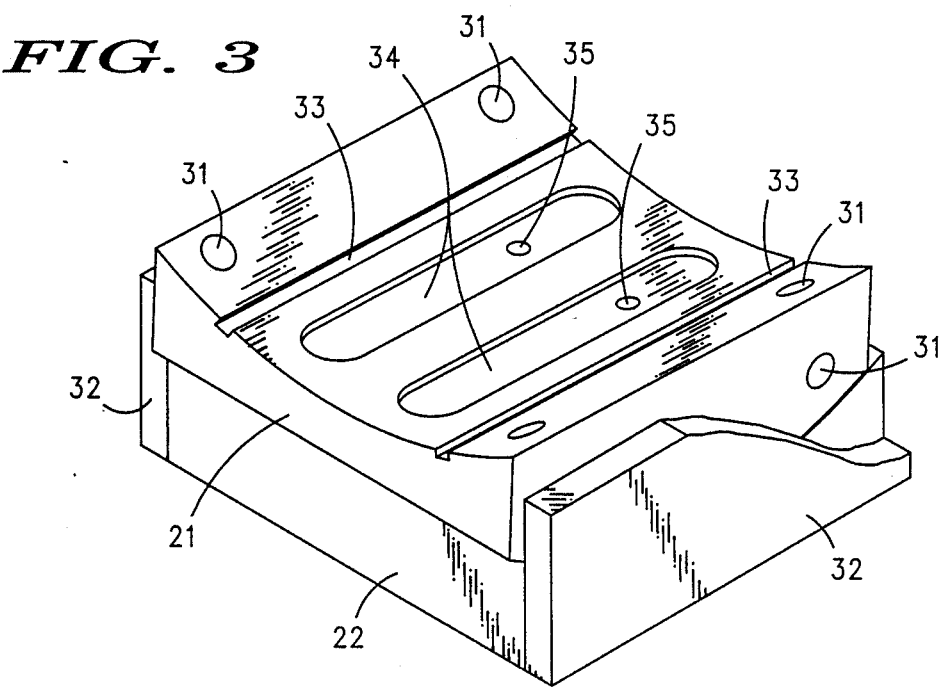
FIG. 3 illustrates in greater detail one of the bearing blocks used in FIG. 2.

FIG. 3 is similar to FIG. 2 except the structure above middle bearing block 21 has been removed in order to better illustrate the top surface of middle bearing block 21. In addition, end guides 32 are shown. The top surface of middle bearing block 21 has a plurality of air outlets 31. As illustrated in FIG. 3 four air outlets 31 are illustrated. Two air outlets 31 are located on each side of bearing block 21. Two oval recessed areas 34 are illustrated in the central portion of bearing block 21. Recessed areas 34 are vacuum pockets, and receive vacuum through ports or vacuum passages 35. The purpose of recessed areas or vacuum pockets 34 is to keep top bearing block 19 (FIG. 2) from being repelled off of bearing block 21 when air is supplied through air outlets 31. Also shown on the top surface of bearing block 21 is a suction/pressure isolation groove 33 positioned between pressurized areas fed by air orifices or outlets 31 and vacuum areas or pockets 34. Isolation grooves 33 are provided to allow the vacuum supplied through port 35 and the air supplied through air outlets 31 to act independently. In other words, grooves 33 permit the air bearing function to work independently of the vacuum suction function. Also shown in FIG. 3 are air outlets 31 located on the sides of bearing block 21 adjacent to end guides 32. This provides an air bearing along the sides of bearing block 21 so that it can move freely within end guides 32. End guides are used on all four sides, and air bearings are located between them and rotating or bearing blocks 19 and 21. Opposing end air bearings and their small gaps keep bearing blocks 19 and 21 accurately centered; each end bearing acts somewhat like a compression spring and damper. Note that bearing block 21 is shown slightly moved from its nominal position with respect to bearing block 22 in order to illustrate the direction of movement for middle bearing block 21.

It will be understood that the top surface of bottom bearing block 22 is configured the same as the top surface of middle bearing block 21 except that the entire configuration is rotated 90°. This configuration uses vacuum to pull the parts together and air pressure to separate the parts in order to provide the air bearing. The air pressure in a preferred embodiment, is adjusted to provide a 0.018 millimeter separation between the moving bearing blocks. This configuration permits the air pressure to be left on at all times, or if desired, the air pressure can be removed once thermode 11 makes contact with work piece 13 through film 16. With pressure applied through thermode 11 to work piece 13, work piece 13 will be leveled or aligned and then if desired, air pressure can be removed and the vacuum will maintain the bearing blocks in the desired position. It will be understood that air outlets 31 are actually tiny pressurized orifices, about 0.0127 cm in diameter feeding shallow pockets approximately 0.00254 cm deep and 0.254 cm in diameter. Vacuum passages or ports 35 are relatively large and free-flowing. Vacuum pockets or recessed areas 34 are relatively deep, as shown, and do not need to be oval in shape. Furthermore, those skilled in the art will appreciate that the air orifices can be on the bottom instead of on the top of the bearing blocks or they can be located on the bottom as well as on the top surface of the middle bearing block. The important aspect is that an air bearing be provided between the surfaces that move with respect to each other.

By now it should be appreciated that there has been provided a self aligning air bearing platform which is almost frictionless, and is capable of operation at high temperatures. The self aligning air bearing platform has a bearing system that is easy to lock or unlock due to a vacuum system which will lock the platform in its desired position.

The self leveling air bearing platform is capable of orienting a very small work piece in a coplanar position and can maintain the entire top surface of the work piece in the same coplanar plane. The self orienting or aligning air bearing platform is particularly useful in a tape automated bonding system to bond leads of a film to a semiconductor device. The air bearing platform is capable of maintaining its orientation and is useful to bond a very high pin count integrated circuit semiconductor device. The present invention allows the workpiece to float into parallelism with the mating surface, without allowing sideways motion or twisting. This is important when TAB bonding, since it allows optical alignment of the leads and bumps, with no subsequent misalignment occurring as the bonding tool applies pressure, regardless of whether the bonding tool and workpiece were originally exactly parallel. The constraint of unwanted motion is as important as allowing the desired alignment motion.

We claim:

1. A self aligning air bearing platform, useful for positioning a semiconductor device in a predetermined orientation, comprising: a bottom bearing block having a top surface, the top surface also being cusped shaped so that its front and back edges are at a higher elevation than its center; a middle bearing block positioned over the bottom bearing block and having a top and a bottom surface, the bottom surface being shaped to mate the top surface of the bottom bearing block, the top surface of the middle bearing block being cusped shaped at right angles to the cusped shape of the top surface of the bottom bearing block; a first air bearing between the bottom and middle bearing blocks; a top bearing block positioned over the middle bearing block and having a bottom shaped to mate the top surface of the middle bearing block; a second air bearing between the middle and top bearing blocks; means positioned on the top bearing block for receiving the semiconductor device; and means for keeping the bearing blocks together when air is passing through the air outlets, wherein the means for keeping includes slots in the top of the bottom bearing block and the top of the middle bearing block which serve as vacuum ports.

2. The self aligning air bearing of claim 1 further including isolation grooves positioned between the air outlets and the slots.

3. A self aligning air bearing platform for positioning a work piece, comprising: a bottom bearing block having a concave shaped top surface; an upper bearing block positioned over the bottom bearing block and having a bottom shaped to mate with the top surface of the bottom bearing block and having means for accommodating the work piece; and an air bearing between the bottom and upper bearing blocks, wherein the work piece is a semiconductor device having a top surface and the concave shaped surface has a radial center which coincides with the top surface of the semiconductor device.

* * * * *